(12) United States Patent
Dec et al.

(10) Patent No.: US 7,889,754 B2
(45) Date of Patent: Feb. 15, 2011

(54) ADDRESS RESOLUTION MECHANISM FOR ETHERNET MAINTENANCE ENDPOINTS

(75) Inventors: Wojciech Dec, Amsterdam (NL); Yves Hertoghs, Schilde (BE); Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 1003 days.

(21) Appl. No.: 11/179,993

(22) Filed: Jul. 12, 2005

(65) Prior Publication Data

US 2007/0014290 A1    Jan. 18, 2007

(51) Int. Cl.
*H04J 3/26* (2006.01)

(52) U.S. Cl. ..................................... 370/432

(58) Field of Classification Search ................. 370/432, 370/419, 468, 401, 392, 389, 310, 253, 252, 370/400, 250, 244, 241, 254, 352, 230.1, 370/395.21, 356, 229, 216, 236.2
See application file for complete search history.

(56) References Cited

U.S. PATENT DOCUMENTS

| | | | |
|---|---|---|---|
| 5,848,227 A | 12/1998 | Sheu |
| 6,055,364 A | 4/2000 | Speakman et al. |
| 6,073,176 A | 6/2000 | Baindur et al. |
| 6,078,590 A | 6/2000 | Farinacci et al. |
| 6,188,694 B1 | 2/2001 | Fine et al. |
| 6,301,244 B1 | 10/2001 | Huang et al. |
| 6,304,575 B1 | 10/2001 | Carroll et al. |
| 6,308,282 B1 | 10/2001 | Huang |
| 6,373,838 B1 | 4/2002 | Law et al. |
| 6,424,657 B1 | 7/2002 | Voit et al. |
| 6,430,621 B1 | 8/2002 | Srikanth et al. |
| 6,484,209 B1 | 11/2002 | Momirov |
| 6,502,140 B1 | 12/2002 | Boivie |
| 6,519,231 B1 | 2/2003 | Ding et al. |
| 6,611,869 B1 | 8/2003 | Eschelbeck et al. |
| 6,665,273 B1 | 12/2003 | Goguen et al. |
| 6,668,282 B1 | 12/2003 | Booth, III et al. |

(Continued)

FOREIGN PATENT DOCUMENTS

WO    WO 2007/031002 A    3/2007

(Continued)

OTHER PUBLICATIONS

Lahti "Quality of Service in the Poin-to-Point Protocol over Ethernet" in: Google Scholar (on line, <URL:http://www.e.kth.se/~e95_pla/exjobb/doc/Lahti_Thesis_QoS_in_PPPoE.pdf>) Oct. 1, 2000.

(Continued)

*Primary Examiner*—Derrick W Ferris
*Assistant Examiner*—Mohammad Anwar
(74) *Attorney, Agent, or Firm*—The Law Offices of Bradley J. Bereznak

(57) ABSTRACT

A method of operation for a node of an Ethernet access network includes issuing a multicast message on the Ethernet access network by a maintenance end point (MEP) of the node. The multicast message contains a name of a target MEP. The node is further operable to receive a unicast reply message from the target MEP, the unicast message reply containing a MEP identifier (MEP-ID) and a MEP Media Access Control (MAC) address of the target MEP.

8 Claims, 5 Drawing Sheets

U.S. PATENT DOCUMENTS

| | | | |
|---|---|---|---|
| 6,693,878 B1 | 2/2004 | Daruwalla et al. | |
| 6,732,189 B1 | 5/2004 | Novaes | |
| 6,757,286 B1 | 6/2004 | Stone | |
| 6,763,469 B1 | 7/2004 | Daniely | |
| 6,785,265 B2 | 8/2004 | White et al. | |
| 6,789,121 B2 | 9/2004 | Lamberton et al. | |
| 6,798,775 B1 | 9/2004 | Bordonaro | |
| 6,826,698 B1 | 11/2004 | Minkin et al. | |
| 6,829,252 B1 | 12/2004 | Lewin et al. | |
| 6,839,348 B2 | 1/2005 | Tang et al. | |
| 6,850,542 B2 | 2/2005 | Tzeng | |
| 6,852,542 B2 | 2/2005 | Mandel et al. | |
| 6,882,643 B1 | 4/2005 | Mauger et al. | |
| 6,892,309 B2 | 5/2005 | Richmond et al. | |
| 6,954,436 B1 | 10/2005 | Yip | |
| 7,003,102 B2* | 2/2006 | Kiko | 379/413 |
| 7,009,983 B2 | 3/2006 | Mancour | |
| 7,092,389 B2 | 8/2006 | Chase et al. | |
| 7,113,512 B1 | 9/2006 | Holmgren et al. | |
| 7,116,665 B2 | 10/2006 | Balay et al. | |
| 7,173,934 B2 | 2/2007 | Lapuh et al. | |
| 7,277,936 B2 | 10/2007 | Frietsch | |
| 7,310,342 B2* | 12/2007 | Rouleau | 370/397 |
| 7,315,554 B2* | 1/2008 | Baum et al. | 370/469 |
| 7,345,991 B1 | 3/2008 | Shabtay et al. | |
| 7,408,936 B2 | 8/2008 | Ge et al. | |
| 7,466,703 B1 | 12/2008 | Arunachalam et al. | |
| 2002/0032780 A1 | 3/2002 | Moore et al. | |
| 2002/0087721 A1 | 7/2002 | Sato et al. | |
| 2002/0156612 A1* | 10/2002 | Schulter et al. | 703/23 |
| 2002/0196795 A1 | 12/2002 | Higashiyama | |
| 2003/0012183 A1 | 1/2003 | Butler et al. | |
| 2003/0036375 A1 | 2/2003 | Chen et al. | |
| 2003/0101243 A1 | 5/2003 | Donahue et al. | |
| 2003/0110268 A1 | 6/2003 | Kermarec et al. | |
| 2003/0112781 A1* | 6/2003 | Kermode et al. | 370/338 |
| 2003/0142674 A1 | 7/2003 | Casey | |
| 2003/0154259 A1 | 8/2003 | Lamberton et al. | |
| 2003/0177221 A1 | 9/2003 | Ould-Brahim et al. | |
| 2004/0095940 A1 | 5/2004 | Yuan et al. | |
| 2004/0102182 A1 | 5/2004 | Reith et al. | |
| 2004/0125809 A1 | 7/2004 | Jeng | |
| 2004/0141501 A1* | 7/2004 | Adams et al. | 370/389 |
| 2004/0151180 A1* | 8/2004 | Hu et al. | 370/392 |
| 2004/0158735 A1 | 8/2004 | Roese | |
| 2004/0165525 A1 | 8/2004 | Burak | |
| 2004/0165600 A1 | 8/2004 | Lee | |
| 2004/0172559 A1 | 9/2004 | Luo et al. | |
| 2004/0213201 A1* | 10/2004 | Osterlund | 370/351 |
| 2004/0228291 A1 | 11/2004 | Huslak et al. | |
| 2004/0233891 A1 | 11/2004 | Regan | |
| 2004/0264364 A1 | 12/2004 | Sato | |
| 2005/0007951 A1 | 1/2005 | Lapuh et al. | |
| 2005/0025143 A1 | 2/2005 | Chen et al. | |
| 2005/0030975 A1 | 2/2005 | Wright et al. | |
| 2005/0044265 A1 | 2/2005 | Vinel et al. | |
| 2005/0049887 A1* | 3/2005 | Bulleit et al. | 705/1 |
| 2005/0063397 A1 | 3/2005 | Wu et al. | |
| 2005/0068972 A1* | 3/2005 | Burns et al. | 370/412 |
| 2005/0152370 A1 | 7/2005 | Meehan et al. | |
| 2005/0157664 A1 | 7/2005 | Baum | |
| 2005/0157751 A1 | 7/2005 | Rabie et al. | |
| 2005/0163049 A1 | 7/2005 | Yazaki et al. | |
| 2005/0175022 A1 | 8/2005 | Nishimura et al. | |
| 2005/0190773 A1 | 9/2005 | Yang et al. | |
| 2005/0232186 A1* | 10/2005 | Karaoguz et al. | 370/328 |
| 2005/0232228 A1* | 10/2005 | Dharanikota et al. | 370/351 |
| 2005/0239445 A1* | 10/2005 | Karaoguz et al. | 455/414.1 |
| 2005/0249124 A1* | 11/2005 | Elie-Dit-Cosaque et al. | 370/242 |
| 2005/0265309 A1* | 12/2005 | Parandekar | 370/351 |
| 2005/0286503 A1 | 12/2005 | Oda et al. | |
| 2006/0007867 A1* | 1/2006 | Elie-Dit-Cosaque et al. | 370/241.1 |
| 2006/0056414 A1* | 3/2006 | Elie-Dit-Cosaque et al. | 370/392 |
| 2006/0092847 A1* | 5/2006 | Mohan | 370/241.1 |
| 2006/0098607 A1 | 5/2006 | Zeng | |
| 2006/0153220 A1* | 7/2006 | Elie-Dit-Cosaque et al. | 370/432 |
| 2006/0182037 A1 | 8/2006 | Chen et al. | |
| 2006/0248277 A1 | 11/2006 | Pande | |
| 2006/0262794 A1* | 11/2006 | Livet et al. | 370/390 |
| 2006/0285500 A1 | 12/2006 | Booth et al. | |
| 2006/0285501 A1* | 12/2006 | Damm | 370/252 |

FOREIGN PATENT DOCUMENTS

| | | |
|---|---|---|
| WO | WO 2008/089370 | 7/2008 |

OTHER PUBLICATIONS

Pseudo-Wire Edge-To Edge (PWE3) Working Group, Simon DeLord, Uecomm; Philippe Niger, France Telecom; Yuichi Ikejiri, Yuichiro Wada, NTT Debor: "PWE3 Applications & OAM Scenarios; draft-delord-pwe3-oam-applications 02.txt" Standard-Working-Draft, Internet Engineering Task Force, IETF, CH, No. 2, Oct. 1, 2005.

XP015042128 ISSN: 0000-0004 abstract p. 10, paragraph 3 Section 3.1.1.1. on pp. 12-13; http://ftp.ist.utl.pt/pub/drafts/draft-delord-pwe3-oam-applications-02.txt.

Blunk et al. Draft RFC 2284—Extensible Authentication Protocol EAP, Feb. 2004; http://tools.ietf.org/html/draft-ietf-eap-rfc2284bis-09.

Light Reading, Inc., Distributed-Edge Architecture, Nov. 25, 2003; http://www.lightreading.com/document.asp?site=lightreading&doc_id=43679&page_number=4.

Landron, Use of the IEEE Assigned Type Field with IEEE std 802.3, 1998 Edition Local and Metropolian Area Networks, Apr. 16, 2004 http://standards.ieee.org/regauth/ethertype/type-tut.html.

Marc Lasserre et al.,"Virtual Private LAN Services over MPLS", Mar. 2003, Internet Draft Document, pp. 4-22; http://tools.ietf.org/html/draft-lasserre-vkompella-ppvpn-vpls-04.

Mike McFarland, Sr. Product Line Manager, "Metro Ethernet Will require New OAM Tools", pp. 1-5.

* cited by examiner

ADDRESS RESOLUTION MECHANISM FOR ETHERNET MAINTENANCE ENDPOINTS

RELATED APPLICATIONS

The present application is related to concurrently filed application Ser. No. 11/180,003 filed Jul. 12, 2005, entitled, "Broadband Access Node With A Virtual Maintenance End Point", which is assigned to the assignee of the present application.

FIELD OF THE INVENTION

The present invention relates generally to data communications systems; more specifically, to service provider (SP) networks with Ethernet access domains that support Operations and Management (OAM) functions.

BACKGROUND OF THE INVENTION

Digital Subscriber Line (DSL) technology is widely-used today for increasing the bandwidth of digital data transmissions over the existing telephone network infrastructure. In a typical system configuration, a plurality of DSL subscribers are connected to a service provider (SP) network through a Digital Subscriber Line Access Multiplexer (DSLAM), which concentrates and multiplexes signals at the telephone service provider location to the broader wide area network (WAN). Basically, a DSLAM takes connections from many customers or subscribers and aggregates them onto a single, high-capacity connection. The DSLAM may also provide additional functions such as Internet Protocol (IP) address assignment for the subscribers, IP Access Control Lists (ACLs), etc.

Asynchronous Transfer Mode (ATM) protocol networks have traditionally been utilized for communications between DSLAM devices and Broadband Remote Access Servers (BRAS) that provide authentication and subscriber management functions. A BRAS is a device that terminates remote users at the corporate or Internet users at the Internet service provider (ISP) network, and commonly provides firewall, authentication, and routing services for remote users. Next generation BRAS devices are frequently referred to as Broadband Network Gateway (BBNG) devices. The ATM protocol is an international standard in which multiple service types (such as voice, video, or data) are conveyed in fixed-length "cells" over point-to-point network connections. Data packet cells travel through the ATM switches from the user network interface (UNI) to the network node interface (NNI) through a process called Virtual Path Identifier/Virtual Channel Identifier (VPI/VCI) translation. The VPI/VCI identifiers are used by the ATM switches to switch/direct the subscriber traffic to a given feature server, and in the reverse direction to forward server traffic to a given DSLAM/subscriber, without ambiguity. Furthermore, the VPI/VCI mechanism is used by the feature server to identify the subscriber.

U.S. Pat. No. 6,801,533, for example, teaches a system and method for proxy signaling in a DSLAM and generally describes a DSL network that includes communication transfer of signals from a DSLAM to a remote access server over a high-speed ATM network. Transmission of packet data over an ATM network is also taught in U.S. Pat. No. 6,785,232. U.S. Pat. No. 5,818,842 teaches a communication system with an interface device that connects a plurality of interconnected ATM switches to Local Area Network (LAN) interface adapters for connection to LAN networks.

Ethernet is a technology that originated based on the idea of peers on a network sending messages in what was essentially a common wire or channel. Each peer has a globally unique key, known as the Media Access Control (MAC) address to ensure that all systems in an Ethernet have distinct addresses. Most modern Ethernet installations use Ethernet switches (i.e., "bridges") to implement an Ethernet "cloud" or "island" that provides connectivity to the attached devices. The switch functions as an intelligent data traffic forwarder in which data packet frames are sent to ports where the destination device is attached. Examples of network switches for use in Ethernet network environments are found in U.S. Pat. Nos. 6,850,542, 6,813,268 and 6,850,521.

The use of Ethernet as a metropolitan and WAN technology has driven the need for a new set of OAM protocols. Two main areas that have been the subject of recent attention are Service OAM and Link OAM protocols. Service OAM provides monitoring and troubleshooting of end-to-end Ethernet service instances, while Link OAM allows a service provider to monitor and troubleshoot an individual Ethernet link. Much of the work on Service OAM protocols is found in the IEEE 802.1ag specification, which specifies protocols and procedures to support connectivity fault management (CFM) used for discovery and verification of the path, through bridges and LANs, taken for data frames to and from specified network users. The 802.1ag standard basically allows service providers to manage each customer service instance, or Ethernet Virtual Connection (EVC), individually. Since Service OAM typically operates on a per-EVC basis irrespective of the underlying transport mechanism, 802.1ag essentially enables the SP to determine if an EVC has failed.

Ethernet CFM, as defined in 802.1ag, relies on a functional model consisting of hierarchical maintenance or administrative domains that are defined by provisioning which switch/router ports are interior to the particular domain. In addition, maintenance end points (MEPs) are designated on the edge nodes of a domain (each EVC), and maintenance intermediate points (MIPs) are designated on relevant interior ports. FIG. 1 is an example of an Ethernet OAM network topology that illustrates a hierarchy of domains that includes customer, provider, operator, and Multi-protocol Label Switching (MPLS) domains, which correspond to Levels 0, 3, 5, and 7, respectively, in the proposed IEEE 802.1ag specification. In CFM terminology, levels define the access control structure for domain information and state, with higher numbers (toward the physical level) being bounded by lower numbers (toward the service level). As can be seen, the SP network includes an IP/MPLS core connected with a pair of Ethernet access domains via network-facing provider edge (n-PE) devices. Each access domain has a user-facing provider edge (u-PE) device providing a link with a customer edge (CE) device, which is commonly referred to as a residential gateway (RG) device. The MEPs for each domain are illustrated by a cross-hatched box under the corresponding network device, with the MIPs being shown as open boxes in the connection path.

One of the drawbacks of Ethernet CFM as defined in 802.1ag is that it presumes that every node in the network (CE-to-CE in FIG. 1) supports the full set of functionalities defined in that specification. One of these presumptions, for instance, is that every node has a MAC address. The problem, however, is that for broadband access the service terminating node at the customer premises equipment (CPE) typically does not have a MAC address or the ability to run the full protocol suite defined in the 802.1ag standard. In many cases, the first-mile connection to the customer demarcation operates in accordance with a legacy link OAM scheme such as ATM OAM, or in compliance with the IEEE 802.3 (Clause 57) standard (formerly known as 802.3ah), which do not fully support 802.1ag functionality. In other words, the ATM-only architecture of the past has evolved to the point where the DSLAM is now typically connected via ATM to the CPE and via Ethernet to the BBNG. This makes it very difficult, if not impossible, for a SP network administrator or operator to check the physical connection path that data packets take between the RG and the BBNG nodes in response to, say, a service complaint received from a subscriber with an ATM connection to a DSLAM device.

In a DSL environment, a network operator typically responds to a service complaint by executing an OAM procedure to a MEP on the DSL line based on a database that contains a mapping of a customer-id to DSLAM-name-and-port-id alongside an ATM VPI/VCI mapping for that port-id. In the proposed 802.1ag standard, each MEP is addressed by a unique MAC address (per Virtual Local Area Network (VLAN)), its Maintenance Association (MA), and a maintenance endpoint identifier "MEP-ID". This address information, which is essential to conduct OAM functions, is commonly conveyed through the use of periodic continuity check messages (CCMs) multicast by every MEP. But in the case where there are tens of thousands of users logically connected to a single VLAN, multicasting CCMs by each MEP can result in a flood of messaging that overwhelms network resources. In addition, the BBNG terminating associated Service VLANs (S-VLANs) and Service/Customer VLAN (S/C-VLAN) combinations might have difficulty intercepting the CCMs.

One solution is to simply disable the continuous sending of CCMs by the user-line MEPs. However, this creates a new problem since those messages convey address information about a given user port, thus making it difficult to transmit a message to a target port from a remote part of the network.

Further complicating the use of 802.1ag for issuing OAM functions in an Ethernet DSL environment is the fact that many SPs consider it to be too operationally complex to maintain a database of customer-id to the MAC address assigned to each user port of the DSLAM. In other words, network SPs prefer to use a customer-id to DSLAM-name to port-id mapping, rather than retain knowledge of the MAC address of each port.

Therefore, what is a needed is a mechanism in an Ethernet DSL environment for resolving the address of a MEP situated on a given user-line, thus enabling a network operator to perform OAM functions without requiring the user-line MEP to continuously send CCMs.

By way of further background, U.S. Patent Publication No. 2005/0099951 teaches a method of detecting a fault on an Ethernet network using OAM connectivity check functions in which connectivity check frames are generated and sent to either a specific unicast destination address or a multicast destination address. United States Patent Publication No. 2005/0099949 describes a further method that defines OAM domains by defining reference points on the Ethernet network, and using the reference points to insert and extract Ethernet OAM frames. A system for interworking between a broadband system such as an ATM system and a GR-303 format system for telecommunication calls is disclosed in U.S. Pat. No. 6,667,982.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A multicast-based mechanism for resolving the address of a user-line MEP (i.e., its MAC address and MEP-ID), which obviates the need for address advertising CCMs, is described. In the following description specific details are set forth, such as device types, protocols, configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Figure 4:
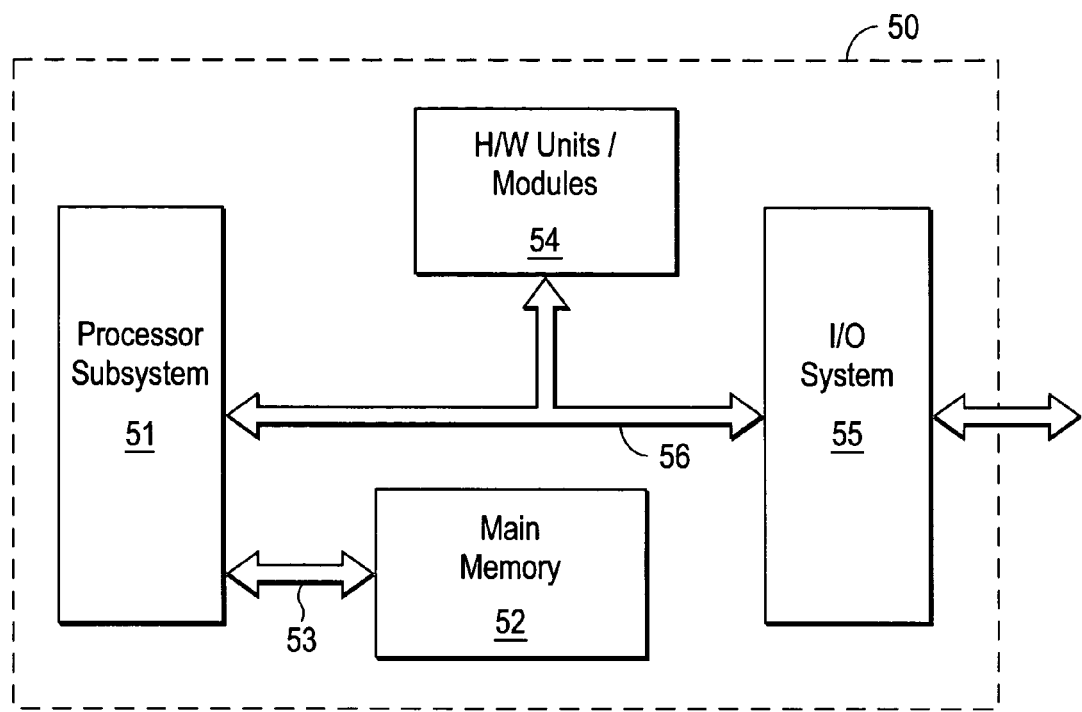
FIG. 4 is a generalized circuit schematic block diagram of a network node.

As shown in FIG. 4, each node 50 typically comprises a number of basic subsystems including a processor subsystem 51, a main memory 52 and an input/output (I/O) subsystem 55. Data is transferred between main memory ("system memory") 52 and processor subsystem 51 over a memory bus 53, and between the processor 51 and I/O subsystems 55 over a system bus 56. Examples of the system bus may include the conventional lightning data transport (or hyper transport) bus and the conventional peripheral component [computer] interconnect (PCI) bus. Node 50 may also comprise other hardware units/modules 54 coupled to system bus 56 for performing additional functions. Processor subsystem 51 may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

In an exemplary embodiment, a conceptual model that includes a so-called "virtual Maintenance Endpoint (vMEP)" which emulates a MEP, as defined in the IEEE 802.1ag specification, is implemented on a broadband access node. Through the use of vMEPs, a broadband access node may check the integrity of the subscriber line by issuing a legacy OAM loopback message (e.g., ATM or 802.3ah loopback), and then signal the response state within the Ethernet access network using 802.1ag continuity check messages (CCMs). This allows for both reactive monitoring (where the operator polls the port status of an access node) and proactive monitoring (where the access node signals the health of the access line using standard CFM messages). It also permits seamless interworking between 802.1ag CFM and legacy link level OAM schemes used commonly used between the Customer Premises Equipment (CPE) and broadband access nodes.

Figure 1:
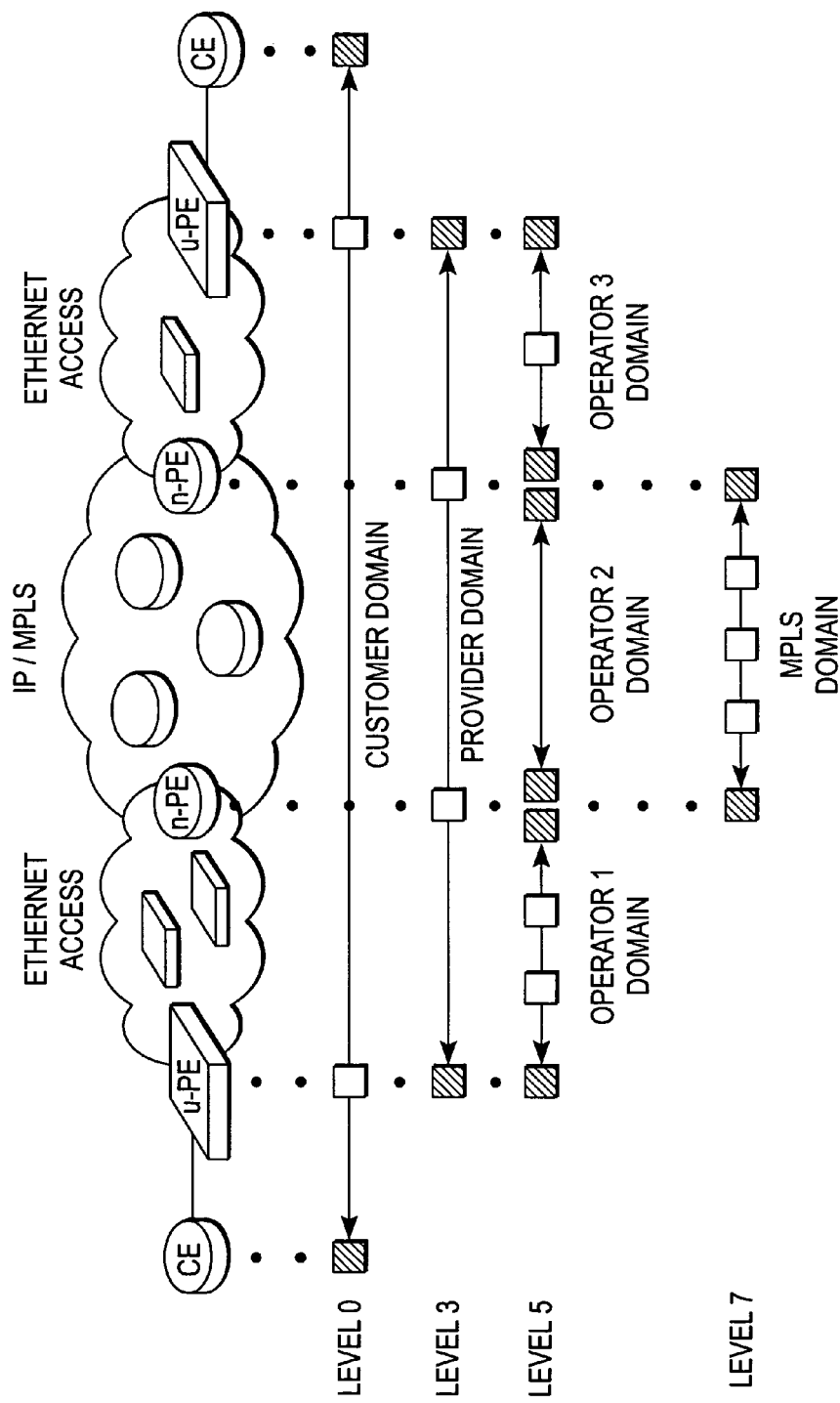
FIG. 1 is a diagram showing various OAM domains for a standard network topology.
Figure 2:
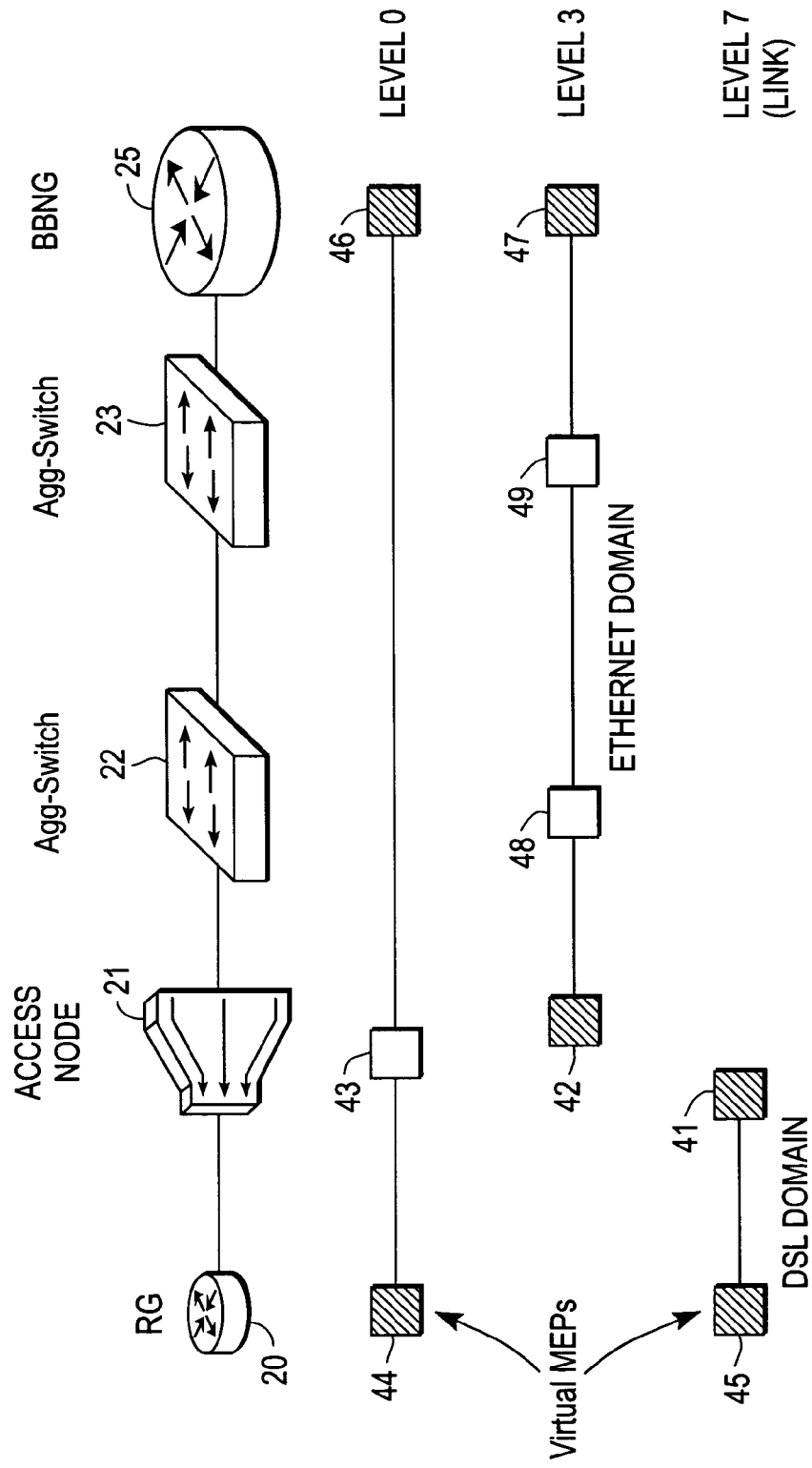
FIG. 2 is a conceptual model of a network with virtual MEPs in accordance with one embodiment of the present invention.

FIG. 2 is a conceptual diagram showing a broadband access/aggregation network with vMEPs. (Although the example of FIG. 2 includes vMEPs, it should be understood that the MEP address resolution mechanism does not rely on the existence of a vMEP; that is, the invented MEP address resolution mechanism is applicable to any OAM.) The diagram of FIG. 2 illustrates an Ethernet access network that includes a BBNG device 25 (e.g., a router) that terminates bridged sessions, e.g., point-to-point over Ethernet (PPPoE) or Internet protocol over Ethernet (IPoE). BBNG device 25 is connected with a broadband access node 21 through bridges or switches 22 & 23, which are frequently referred to as aggregation (Agg) devices. (In the context of the present application, the terms "bridge" and "switch" are considered synonymous.) Access node 21 is basically a user-facing provider edge (u-PE) device, which, in this example, comprises an Ethernet DSLAM that has a subscriber-facing UNI port connected with a RG device 20.

In FIG. 2, BBNG 25 is shown with a MEP 46 at Level 0 and a MEP 47 at Level 3. At the other end, access node 21 is shown with a DSL port having a MEP 42 at Level 3 (Ethernet or provider domain), a MIP 43 at Level 0, and a MEP 41 at link Level 7 (DSL domain). At Level 3, MIPs 48 and 49 run on aggregation switches 22 & 23, respectively. Thus, access node 21 has an inward MEP, a MIP, and an output MEP stacked together. As practitioners in the arts will understand, the inward MEP is defined as the one which is responding to messages originating from the other side of the MAC relay function, whereas the outward MEP is the one which is responding to messages originating at the same side of the relay function. The interior facing function (IFF) of the MEP faces the bridging component and functions to send continuity check messages (CCMs), maintain a line status database, and also send, and reply to, loopback ("ping") messages and trace route messages.

Each MEP also has an exterior facing function (EFF) that sends signals in the opposite direction of the MEP, e.g., for an alarm indication signal (AIS) that provides notification to other elements that there is a fault in the Ethernet network. In this example, each MEP also has a virtual interior facing function (VIFF) that maintains a database by relying on the physical level or link level OAM (e.g., MPLS OAM, ATM OAM, 802.3ah OAM, etc.) For instance, MEP 41 on access node 21 receives line status signals at Level 7 through its VIFF. The EFF on MEP 41 at Level 7 can send an alarm indication signal (AIS) that will bubble up to Level 0 to reach BBNG 25. Practitioners in the arts will understand that the VIFF is optional in a MEP. The VIFF is only present when the link layer has certain characteristics, e.g., it is emulated via MPLS or has 802.3ah link OAM functionality.

The network diagram of FIG. 2 also includes vMEPs 44 & 45 at Levels 0 & 7, respectively. Virtual MEPs 44 & 45 are shown logically on RG 20, but in actuality, vMEPs 44 & 45 comprise a software construct that runs on one or more processors of access node 21. (The vMEPs may alternatively comprise hardware resident on the access node.) In other words, the vMEPs at each Level are implemented as software (or firmware) code that is executed by a processor of the DSLAM. The function of the vMEP is to emulate a MEP on the broadband access node so as to allow interworking between legacy broadband access link level OAM schemes and 802.1ag signals that are commonly sent across the Ethernet access domain network.

Figure 3:
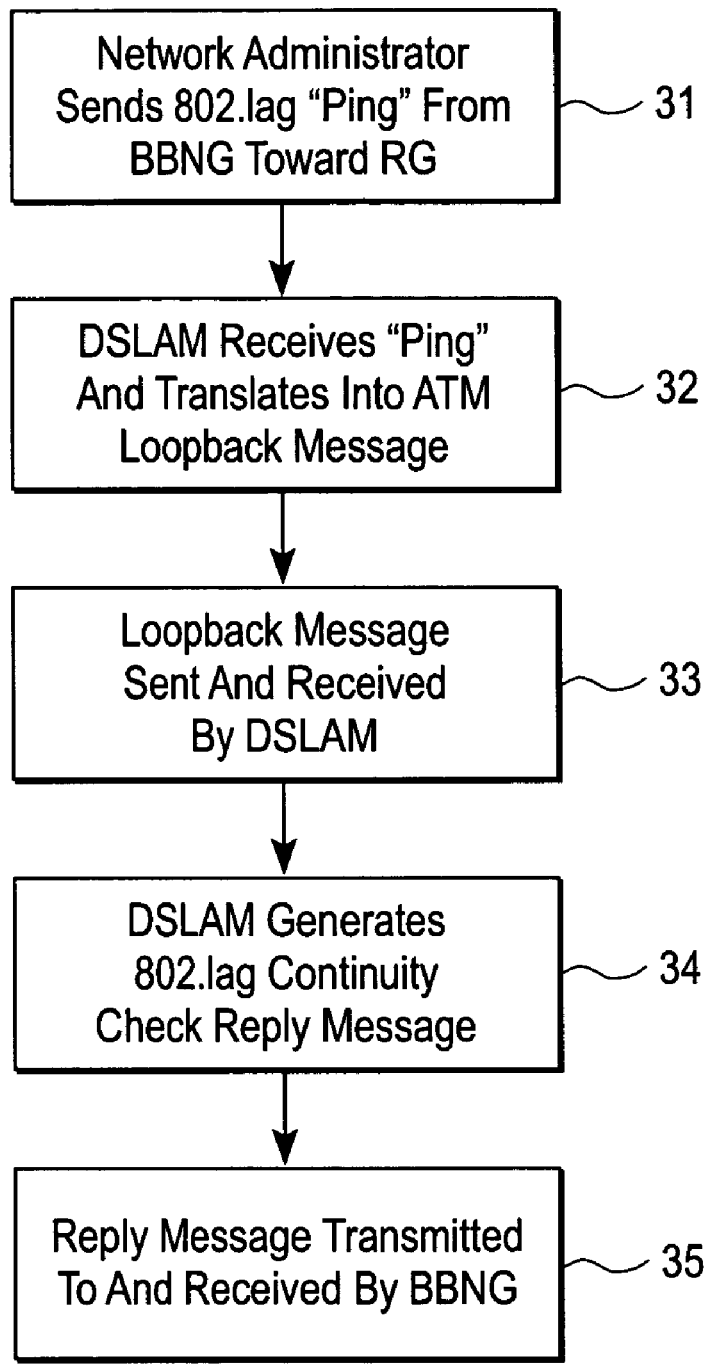
FIG. 3 is a flow chart diagram showing a method of operation in accordance with one embodiment of the present invention.

FIG. 3 is a flow chart diagram that illustrates an example network operation in accordance with one embodiment of the present invention in which a network administrator verifies connectivity in response to a complaint from a subscriber. The verification process begins with the transmission of an 802.1ag loopback message by a MEP on the BBNG of the Ethernet access domain at the request of the network administrator (block 31). The purpose of the loopback message is to determine whether the target maintenance end point is reachable or not, similar in concept to an Internet Control Message Protocol (ICMP) echo or "ping" message. When the loopback message is received at the other end of the access network, the vMEP running on the DSLAM translates the loopback message into a legacy OAM loopback message appropriate for the customer link between the DSLAM and RG. In this example, the 802.1ag loopback message is translated into an ATM loopback message (block 32). In other configurations, the 802.1ag loopback message may be translated into an 802.3ah loopback message, or another type of connectivity check message that checks the real, physical connection path between the RG and access node.

After the DSLAM sends out and receives the ATM loopback message response back from the RG (block 33), thereby confirming connectivity with the subscriber at the link level, the vMEP on the DSLAM generates an 802.1ag loopback reply message (block 34 that is transmitted back to the BBNG (block 35). Note that from the standpoint of the BBNG, the translation process that occurs at the DSLAM is completely transparent. Thus, through the use of virtual MEPs the BBNG router can send a connectivity check message at the Ethernet domain Level which results in a remote ATM loopback (via the VIFF function) on the DSL line. In the example of FIG. 2, Outward facing MEP 41 of access node 21 "receives" the loopback message from vMEP 45 at the same Level. MIP 43 is defined to allow higher domain level message "translation" between inward and outward MEPs 42 & 41, such that the inward MEP 42 can send a connectivity status message reply back to MEP 47 of BBNG 25.

Instead of reactive monitoring of the line between the subscriber and the DSLAM, the vMEPs on the access node may proactively issue periodic connectivity check messages. These are "heart-beat" multicast messages that allow the vMEPs to detect loss of service connectivity, basically emulating 802.1ag CCMs at a high level.

As previously discussed, in the 802.1ag standard the ability of a MEP to send a unicast message to another target MEP located at the same maintenance association (MA) level relies on the source MEP's database containing an entry that includes the MAC address and MEP-ID of the target MEP. The 802.1ag standard may be implemented in software or as part of hardware application specific integrated circuits (ASICs) that comprise the I/O system or hardware modules on the network nodes. According to one embodiment of the present invention, in cases where CCM functionality is disabled, MEPs configured on a subscriber port are administratively configured (either manually or automatically) with a MEP_Name parameter.

The MEP_Name is similar to the circuit-id or customer-line-id that broadband operators typically use to identify a DSL line associated with a given customer and service instance of the customer. The MEP_Name may take a variety of different formats, such as the format specified in Request for Comment, RFC3046 (Dynamic Host Configuration Protocol (DHCP) Option82). Another suitable format is the MEP NAME Type Length Value (TVL) specified in 19.3.11.3.2 of IEEE802.1ag. In the presently described embodiment, translation of the MEP_Name to the corresponding MAC address and MEP-ID takes place in accordance with a maintenance point resolution protocol in which MEPs that have CCMs disabled are configured to process two maintenance point resolution messages: a Maintenance Point Resolution Query Message (MRQM), and a Maintenance Point Resolution Response Message (MRRM).

The purpose of the MRQM is to query, within the VLAN (or Service Virtual Local Area Network (S-VLAN)) and at the MA level, all MEPs to determine which are configured with a particular MEP_Name (not found in the querying MEP's local database). In one implementation, the target MEP_Name (i.e., the name of the MEP whose address is trying to be resolved), Maintenance Association Identifier (MAID), and the MEP-ID are transmitted in the MRQM body as TLVs using the standard CFM message header. The MRQM is multicast to all MEPs with a specific opcode defined for the targeted MA level. All MEPs receiving the MRQM and recognizing the opcode respond by comparing the received MEP_Name to the locally configured MEP_Name. In the event of a match, the MEP responds with a MRRM back to the querying MEP. All MEPs that do not find a local match with the MEP_Name silently drop the message and take no further action. Queries that result in no response received back after a reasonable amount of time may generate a "MEP_Name Unresolved" message that is communicated to the network administrator or operator.

It should be understood that MEPs not recognizing the specified opcode are configured to simply behave in accordance with the procedures set forth in 802.1ag for handling an unknown opcode.

Conversely, the purpose of the MRRM is to allow a MEP that has a local matching MEP_Name to reply to a MRQM from a querying or originating MEP in the VLAN (or S-VLAN) and at the MA level on which the query was received. In one implementation, the MRRM is a unicast message that contains the MEP_Name, MAID, MEP-ID, and the MEP MAC address as TLVs using the standard CFM message header. The MRQM is multicast to all MEPs with a specific opcode defined for the targeted MA level. All MEPs receiving the MRQM and recognizing the opcode respond by comparing the received MEP_Name to the locally configured MEP_Name. In the event of a match, the MEP responds with a MRRM back to the querying MEP. All MEPs that do not find a local match with the MEP_Name simply drop the message and take no further action.

Upon receiving the MRRM, the original querying MEP updates its local database with the MEP-ID and the MEP MAC address information contained in the MRRM. In this context, it should be understood that both MRRMs and CCMs can be utilized to populate the MEP databases. That is, not all MEPs are required to have continuity check messaging disabled; instead, some MEPs may have CCMs disabled while other MEPs have continuity check messaging enabled. Additionally, queries that result in no response received back after a reasonable amount of time may generate a "MEP_Name Unresolved" message that is communicated to the network administrator or operator. In the event that multiple responses are received, a MEP may report a "MEP_Name Inconsistency" error to the network administrator.

Figure 5:
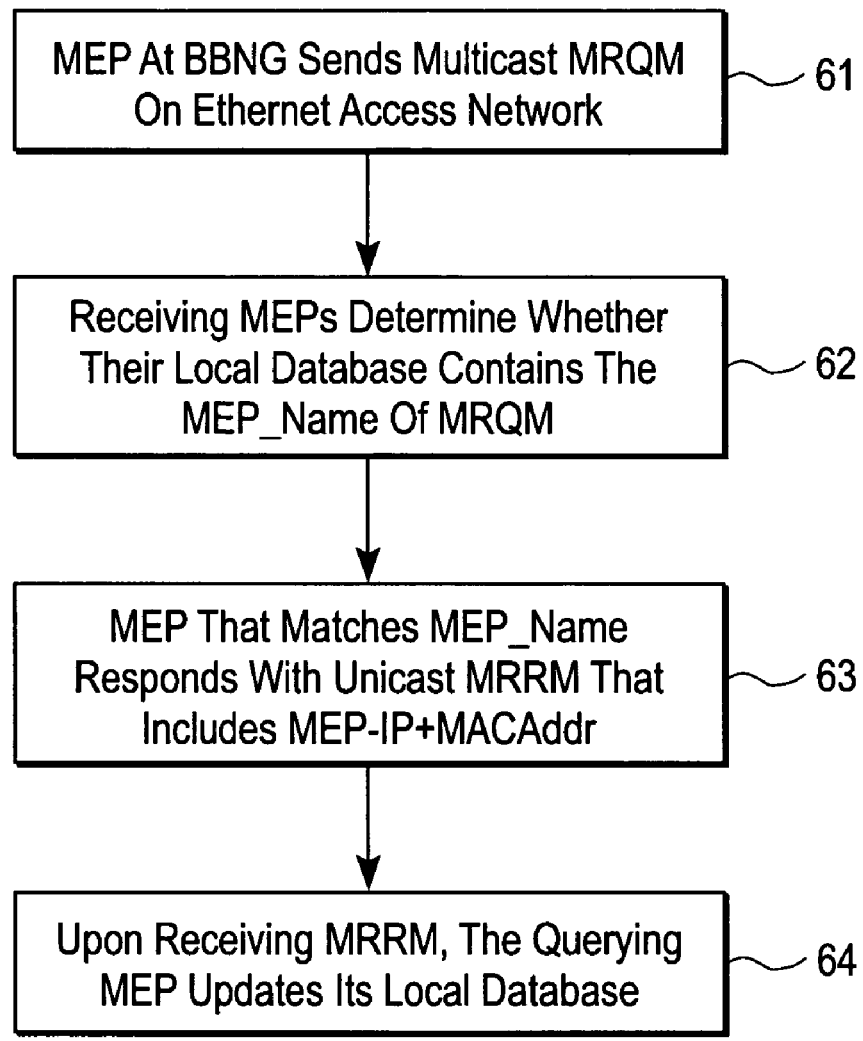
FIG. 5 is a FIG. 5 is a flow chart diagram of the operations of a network node in accordance with one embodiment of the present invention.

FIG. 5 is a flow chart diagram summarizing the operations described above. According to this embodiment of the present invention IEEE 802.1ag is enhanced with the ability to selectively turn off CCMs so as to overcome the problems associated with flooding the network with such messages. With CCMs turned off, a maintenance point resolution protocol is implemented wherein each MEP of the network is configured with a MEP_Name.

The process of resolving the MEP-ID and MEP MAC address parameters of a MEP situated on a user-line begins with the issuance of a multicast MRQM from a remote point (e.g., a BBNG) which contains the MEP_Name of the target MEP (block 61). MEPs that receive the MRQM and recognize the opcode, respond by checking their local database for a configuration match with the MEP_Name contained within the MRQM (block 62). In the event of a match, the MEP replies with a MRRM unicast back to the querying MEP. The MRRM includes the replying MEP's MEP-ID and MEP MAC address (block 63). The address resolution process is completed when the MRRM is received by the querying MEP, which then updates its local database with the MEP-ID and MEP MAC address information (block 64).

It should also be understood that elements of the present invention may be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions. Elements of the present invention may be downloaded as a computer program product, wherein the program may be transferred to a node or switch by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A method of operation for a broadband access node of a Service Provider (SP) Ethernet access network, the method comprising:

issuing a multicast message on the SP Ethernet access network by a maintenance end point (MEP) of the broadband access node, the multicast message containing a name of a target MEP and a specific opcode defined for a targeted maintenance association (MA) level, the name not being included in a local database of the MEP, the target MEP having continuity check messaging disabled;

receiving a unicast reply message from the target MEP, the unicast reply message containing a MEP identifier (MEP-ID) and a MEP Media Access Control (MAC) address of the target MEP; and updating the local database of the MEP with the MEP-ID and MEP MAC address of the target MEP.

2. The method of claim 1 wherein the broadband access node comprises a router.

3. The method of claim 1 wherein the broadband access node comprises a Broadband Network Gateway (BBNG).

4. A method of operation for a broadband access node of a Service Provider (SP) Ethernet access network, the method comprising:

receiving a multicast message on the SP Ethernet access network from a remote maintenance end point (MEP), the multicast message being compatible with a 802.1ag standard and containing a MEP_name not included in a database of the remote MEP;

recognizing a specific opcode of the multicast message, the specific opcode being defined for a targeted maintenance association (MA) level;

comparing the MEP_name against a configuration entry in a local database of the broadband access node;

issuing a unicast reply message to the remote MEP in response to the MEP_name matching the configuration entry, the unicast reply message containing a MEP identifier (MEP-ID) and a MEP Media Access Control (MAC) address of a MEP of the broadband access node, the MEP having continuity check messaging disabled.

5. The method of claim 4 wherein the broadband access node comprises a Digital Subscriber Line Access Multiplexer (DSLAM).

6. A method of operation for a network node that implements a maintenance end point (MEP) comprising:

issuing a maintenance point resolution query message (MRQM) that queries a plurality of other MEPs on a Service Provider (SP) Ethernet network which of the other MEPs carries a configured MEP_name not found in a local database of the MEP, the MRQM having a specific opcode defined for a targeted maintenance association (MA) level;

receiving a maintenance point resolution response message (MRRM) from at least one of the other MEPs that has continuity check messaging disabled, the MRRM containing a MEP identifier (MEP-ID) and a MEP Media Access Control (MAC) address associated with the configured MEP_name; and updating the local database of the MEP with the MEP-ID and MEP MAC address associated with the configured MEP_name.

7. A broadband access node of a Service Provider (SP) Ethernet access network, the broadband access node comprising:

a port for connection with the SP Ethernet access network;

a processor to run code that implements a maintenance end point (MEP), the MEP being operable to issue a multicast message on the SP Ethernet access network via the port, the multicast message containing a configured name of a target MEP, the configured name not being included in a local database of the MEP, the target MEP having continuity check messaging disabled, the processor also being operable to receive a unicast reply message from the target MEP, the unicast reply message containing a MEP identifier (MEP-ID) and a MEP Media Access Control (MAC) address of the target MEP, the processor being further operable to update the local database of the MEP with the MEP-ID and MEP MAC address of the target MEP.

8. The broadband access node of claim 7 wherein the multicast message comprises specific opcode defined for a targeted maintenance association (MA) level.

* * * * *